United States Patent [19]

Hice

[11] Patent Number: 4,731,525

[45] Date of Patent: Mar. 15, 1988

[54] MODULAR MICROPROCESSOR-BASED SYSTEM FOR PRINTING AND READING SCHOOL ATTENDANCE RECORDKEEPING CODES ON FORMS

[75] Inventor: John R. Hice, Santa Paula, Calif.

[73] Assignee: Data Information Management Systems, Inc., Ventura, Calif.

[21] Appl. No.: 827,257

[22] Filed: Feb. 7, 1986

Related U.S. Application Data

[63] Continuation of Ser. No. 505,234, Jun. 17, 1983, Pat. No. 4,578,572.

[51] Int. Cl.[4] .............................................. G06K 7/10

[52] U.S. Cl. ..................................... 235/472; 235/383

[58] Field of Search ................................ 235/383, 472

[56] References Cited

U.S. PATENT DOCUMENTS

| | | | |
|---|---|---|---|
| 4,264,396 | 4/1981 | Stewart | 235/383 |
| 4,415,065 | 11/1983 | Sandstedt | 235/383 |
| 4,415,802 | 11/1983 | Long | 235/383 |
| 4,463,250 | 7/1984 | McNeight | 235/383 |
| 4,508,962 | 4/1985 | Yamasaki | 235/383 |
| 4,529,871 | 7/1985 | Davidson | 235/383 |

*Primary Examiner*—Harold I. Pitts

*Attorney, Agent, or Firm*—Drucker & Sommers

[57] ABSTRACT

A modular microprocessor-based code printing and reading system, adapted to print a personal coded identifier and other codes relating to categories of school-attendance recordkeeping on a form, and to read the codes from the form to generate data for processing thereof. The system is particularly adapted for use in the school-attendance recordkeeping process, with the codes including a bar code, representing an identifier assigned to the person so identified.

The system includes a laser printer, micropocessor-based, operable in response to a laser control program, for printing the codes associated with the particular person at the appropriate location on the form.

The system further includes a portable compact reader, microprocessor-based, which includes a wand adapted to sense the bar code on the form. The reader is operable in response to control by the operator, and to a reader control program, for reading the bar code, to generate data relating to the person identified thereby for processing thereof.

10 Claims, 1 Drawing Figure

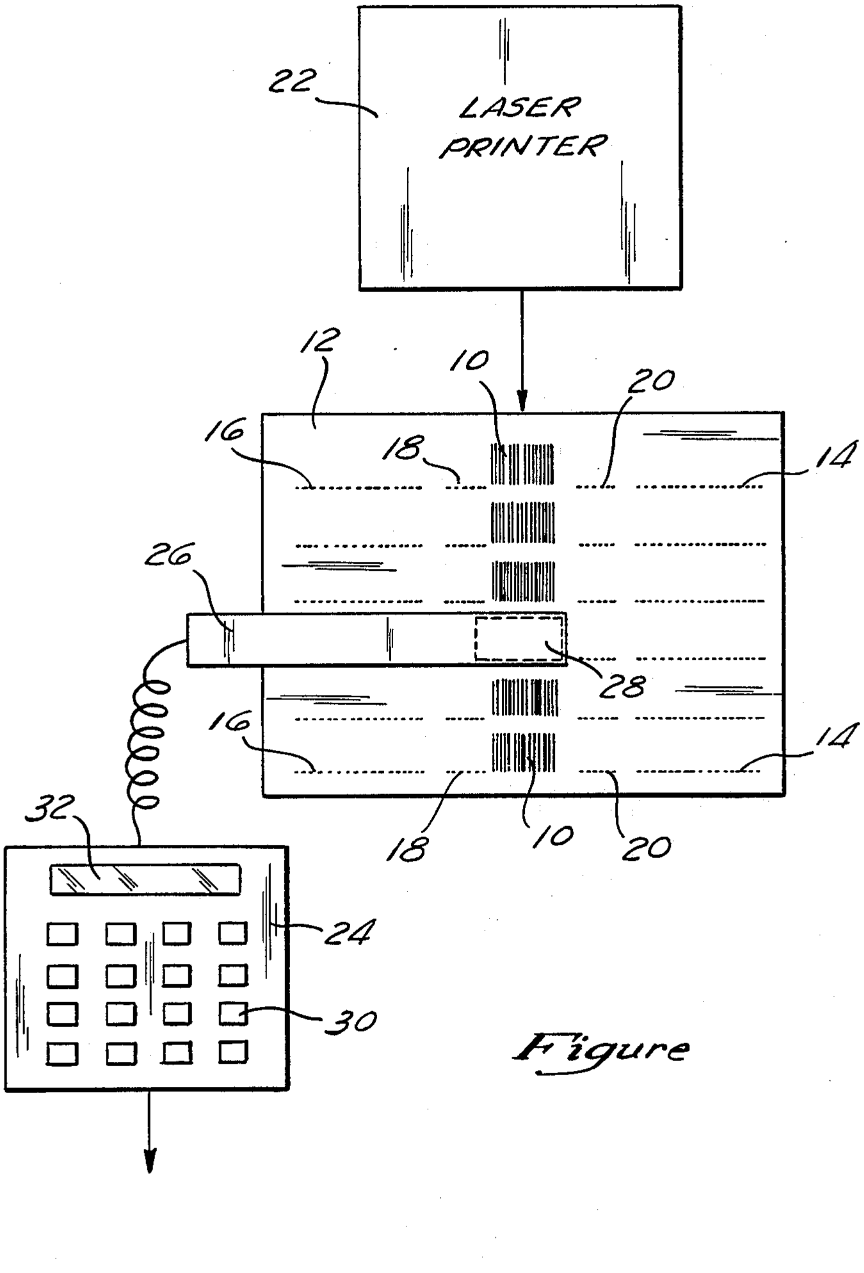
Figure

MODULAR MICROPROCESSOR-BASED SYSTEM FOR PRINTING AND READING SCHOOL ATTENDANCE RECORDKEEPING CODES ON FORMS

RELATED APPLICATION

This is a continuation of Ser. No. 505,234, filed June 17, 1983, now U.S. Pat. No. 4,578,572.

BACKGROUND OF THE INVENTION

The invention relates generally to systems for printing and reading forms for processing of data generated thereby. It relates specifically to a modular system, microprocessor-based, for printing a coded indentifier on a form and reading the coded identifier to generate data relating to the person identified by the code.

The prior art includes systems for printing and reading forms to generate data relating to particular persons identified on the forms. Systems used to gather and process data relating to school attendance recordkeeping included the printing of forms to be filled in manually by each teacher in each class, to be manually gathered, and to be manually read for processing of the data gathered thereby. The school attendance recordkeeping information manually gathered and entered in such system related to absences or tardiness, and clearance thereof, where such clearances were based on authorized excuses therefor.

Such school attendance recordkeeping systems enable the preparation of attendance reports required by the State, enable the tracking of attendance patterns for notification of parents when truancy occurs, and enable counseling of students when excessive absences are noted, so as to reduce attendance problems and increase daily attendance. Such systems must be further able to identify "tardy" students as opposed to those who are absent.

Among the problems associated with such school attendance recordkeeping systems are the collection, entry, maintenance and tracking of large amounts of data relating to absences, tardiness, and clearance information. Further, teachers are reluctant to devote time to such projects, such tasks are very labor-intensive, and the accuracy of the data gathered is highly questionable.

It has been known to provide a hand-held stylus, adapted to both optically read printed lines, such as bar codes, and print out information addressed at such bar codes and obtained thereby from computer storage, as in Uberbacher, Read/Write Stylus, IBM Technical Disclosure Bulletin, Vol. 19, No. 1 (June 1976).

However, the stylus includes an optical read head at one end, and a special form electroerosion print head at the other end for enabling hand-directed printing on special aluminum-coated paper, and does not include elements and functions adapted for use in the school attendance recordkeeping process.

It has been further known to read bar code with devices which include various elements and functions, and which are adapted for use in various fields, including devices for imprinting price information, as in Snow U.S. Pat. No. 4,028,537, and for printing bar code and scanner alignment mark information, as in Bobart et al U.S. Pat. No. 4,349,741. Such known devices further include same for automatically inventorying coded items with a scanner and mark producing device, as in Koenig et al. U.S. Pat. No. 4,180,204, counterfeit detecting, as in McNeight et al., U.S. Pat. No. 4,463,250, and reading of bar code which may include an even or odd parity bit as part thereof, as in Mc Waters et al. U.S. Pat. No. 4,402,088.

However, none of such devices include elements and functions adapted for use in processing data in a school attendance recordkeeping process, and for enabling a person's file therein to be directly addressible without correlation to a control file.

SUMMARY OF THE INVENTION

The invention is adapted to overcome the above problems as well as others associated with the prior art. It provides a modular microprocessor-based code printing and reading system, particularly useful in the school-attendance recordkeeping process. The microprocessor-based system significantly lessens the possibility of problems in the use of forms in the school-attendance recordkeeping process. It enables rapid, efficient, and convenient printing of forms, with personal student codes accurately and efficiently printed thereon. It further enables rapid, economical, and efficient reading of the personal student identifier codes and other codes relating to categories of school-attendance recordkeeping with greater accuracy and less margin for error, for generating data for processing thereof.

The system includes a laser printer, microprocessor-based, for rapidly, economically, accurately and efficiently printing personal student and attendance-related bar code identifiers on the form. Each identifier bar code is assigned exclusively to a particular student. The laser printer is adapted to be operable responsive to a control program therefor.

A portable compact reading device, microprocessor-based, is included in the system, for accurately, economically, rapidly and efficiently reading from the form the personal bar code identifier and other codes relating to categories of school-attendance recordkeeping. The reading device is adapted to be operable responsive to control by a control program therefor, and movement by the operator of a wand code-sensing portion thereof relative to the bar code on the form. The reading device enables one operator, having little technical training, to interface with the system to control system functions. It is readily and conveniently operable by a non-technical operator, not requiring a person trained in computers for use thereof, making it convenient and efficient to use. One operator can perform the work previously done manually by a large number of people, more accurately, and in significantly less time and at less expense.

The system reduces the amount of keying-in of data required, and minimizes the amount of manual data collection required. Class rosters are produced by the laser printer, with unique personal identifier bar codes assigned to each student. The teachers then mark each absent student on such roster, and the rosters are read either at the classroom or at the office by the portable compact reading device. For clearance, an alphabetical list of all students in the school may be produced on the laser printer, with the unique personal identifier bar code opposite each name. A control sheet may then be provided with control bar codes printed thereon for clearance or pre-clearance, for all day or period clearance, with date and reason for clearance, and person authorizing clearance, with student records being accessed by student name. Such a system is efficient and effective in providing school-attendance recordkeeping.

DESCRIPTION OF THE DRAWING

The FIGURE is a partly-schematic block diagram of the modular code printing and reading system, pursuant to the invention.

DETAILED DESCRIPTION OF THE INVENTION

The invention, as shown in the FIGURE and as described herein, comprises a modular microprocessor-based coded-identification printing and reading system. It is adapted to print a code 10 such as a student identification code and/or codes relating to categories of school-attendance recordkeeping (e.g. truancy, tardiness, and clearance) on a sheet of paper which constitutes a form 12, and to read code 10 from form 12. The system is particularly adapted for use in connection with forms used in the school-attendance recordkeeping process.

Code 10 preferably comprises a bar code. In the bar code, the thickness of lines printed on the form, as well as the thickness of spaces provided therebetween, when properly read in combination, convert into characters in a complete identifier code. One type of bar code which may be used comprises the Uniform Product Code (UPC), in which the bar code represents numerical characters. Another type of bar code which may be used comprises the Thirty-Nine (39) Code, in which the bar code represents alphabetical and numerical characters. These bar codes can integrate thereinto preexisting codes for control purposes.

In the school-attendance recordkeeping process, the bar code 10 represents a unique number assigned to a particular student upon entry into the system, typically upon student registration. Such bar code 10 is directly accessible by the system herein, by virtue of the bar coding and associated software controls, without maintaining subsidiary control files containing lists of sequential identifiers and corresponding student names. The identifier generated in bar code is read at the real address space for the individual on the disk, without any correlations to a control file. The bar code 10 is readable as a plurality of bytes, and each byte preferably includes a parity bit for selfchecking and verifying the accuracy of the reading of the byte.

Further, in the school-attendance recordkeeping process, form 12 may comprise class rosters with unique personal identifier bar codes assigned to each student thereon. The teachers then mark each absent student on such roster, and the rosters are read either at the classroom or at the office by the portable compact reading device. For clearance, an alphabetical list of all students in the school may be produced on the laser printer, with the unique personal identifier bar code opposite each name. A control sheet may then be provided with control bar codes printed thereon for clearance or preclearance, all day or period clearance, date, reason for clearance, and person authorizing clearance, with student records being accessed by student name.

The modular microprocessor-based system for printing and reading code 10 on form 12, as shown in the FIGURE, includes a laser printer 22. Laser printer 22, microprocessor-based, includes a laser beam generating and directing system, for rapidly directing a laser beam, under the control of a laser control program, in very fine incremental movements against a drum. The laser beam magnetizes portions of the drum, to produce images thereon to then be transferred to the sheet of paper comprising form 12, for printing form 12 thereby.

Laser printer 22 has the capability of rapidly printing very fine definitive lines, such as those required for printing a code such as bar code 10. It is operable at very high speeds, for large volume printing production requirements. Its speed enables it to print multiple copies for use as form copies, without carbon sheets which are messy for workers in the school-attendance recordkeeping process to handle and use.

Laser printer 22 is operable to rapidly, efficiently and economically produce a large volume of forms, such as those used in the school-attendance recordkeeping process, with the personal student identifier bar code 10 and other codes relating to categories of school-attendance recordkeeping printed thereon, under the control of a laser control program. The printed bar code 10 is capable of being read electronically.

A portable compact code-reading device 24, microprocessor-based, is further included in the modular system. Reading device 24 includes a wand arm 26. Wand arm 26 is operable to rapidly and accurately sense the bar code 10 on form 12, under the control of an operator, in a convenient and efficient manner. It may be used, for example, in the school-attendance recordkeeping process, to identify students who were absent or late for school, or for clearance of records thereof upon receipt of authorized excuses therefor, by sensing, through sensing means in end 28 of wand 26, the bar code 10 associated with each student or bar code identifier function.

Wand arm 26 enables rapid and accurate inputting of data into reading device 24, by sensing bar code 10. Wand arm 26 is preferably comprised of a rubber housing, more wear-resistant than plastic. It preferrably includes a glass portion, protected in a projecting metal casing at sensing end 28, such that the glass does not touch the sheet of form 12 for accurate viewing, more accurate than plastic which tends to scratch and discolor. Sensing end 28, upon complete reading of bar code 10, causes an audible tone to sound. If the tone sounds, the bar code 10 has been accurately read. If the tone does not sound, bar code 10 has not been read. The operator must then rewand bar code 10, in an effort to read the code. If the tone does not sound after several re-wandings, the operator may manually key in the code identifier 18 for form 12, through keyboard 30 of reading device 24. Sensing end 28 is able to distinguish bar code 10 from other marks written thereover.

Reading device 24, which includes menu-driven keyboard 30, further includes an associated display 32, for manually keying in identifier 18, as backup in the event that sensing end 28 of wand arm 26 is unable to sense bar code 10, and for setting up the mode of system operation. Keyboard 30 includes keys labeled to effect specific functions, such as keys for particular school-attendance recordkeeping process applications. Keyboard 30 and display 32, through a reader control program, enable various specific school-attendance recordkeeping process functions to be performed, including scanning forward, scanning backward, scrolling forward and backward, and selecting data transfer rates for processing thereof. The reader control program, and any other school-attendance recordkeeping-process-related software for controlling reading device 24, is preferrably etched on a programmable read-only memory. This enables efficient preparation of control programs, and rapid and efficient removal and replacement of the program for use of another program therein.

Reading device 24, upon reading bar code 10, generates data for processing thereof in a rapid and efficient manner, enabling accurate and prompt completion of functions associated with the school-attendance recordkeeping process. These functions are conducted in significantly decreased time, with greater accuracy, and with significantly decreased requirements for manual labor.

The data captured by reading device 24 upon reading bar code 10 enables processing by a computer suitably programmed to perform school-attendance recordkeeping process functions. The system further enables capture of the data necessary for fulfilling the legal requirements of a particular school-attendance recordkeeping-process-related application. Transfer of captured data to the computer for processing may be effected, for example, by direct connection of reading device 24 into the computer, transfer through modems over suitable communications lines, or direct input of data onto suitable storage media such as a reel of magnetic tape, then taken to a computing center for processing.

The system is adapted to reduce the amount of manual keying-in, and data collection required. Class rosters may be produced rapidly and efficiently by the laser printer, with unique personal identifier bar codes assigned to each student. The teachers may then mark each absent student on such roster, and the rosters may be read rapidly and efficiently either at the classroom or at the office by the portable compact reading device. For clearance, an alphabetical list of all students in the school may be produced on the laser printer, with the unique personal identifier bar code opposite each name. A control sheet may then be provided with control bar codes printed thereon for clearance or pre-clearance, all day or period clearance, date, reason for clearance, and person authorizing clearance. Student records are accessible directly by student name, in an efficient and effective manner.

The modular system herein does not require a technically-trained computer specialist to operate. It is readily set up and used, and is modularized for convenience of operation. It preferrably uses modular high-sensitivity high-speed software programming for efficiency of operation.

A preferred embodiment of the invention has been set forth above, for the purpose of explaining the invention. However, it is to be understood that variations may be made in such embodiment, which variations are nevertheless within the scope and spirit of the invention, as set forth in the claims herein.

I claim:

1. A modular microprocessor-based apparatus adapted to generate and print pring a unique identifier code assigned to each person on a school attendance roster, on a sheet of paper comprising a form adapted for use in a school-attendance recordkeeping proces, which code is adapted to enable the person's file to be addressible directly without correlation to a control file, and which apparatus is further adapted to enable the personal identifier code to be read from the sheet of paper, to generate data associated with each such person relating to the school-attendance recordkeeping process, for processing of such data for use in the school-attendance recordkeeping process, comprising:

(a) microprocessor-based means for generating and printing the directly-addressible personal identifier code on the sheet of school-attendance recordkeeping process form paper, including means for directing a laser beam therein, adapted to be operable responsive to control by a laser control program for printing the directly-addressible personal identifier code on the school-attendance recordkeeping process form; and (b) microprocessor-based portable compact means for reading the directly-addressible personal-identifier code from the school-attendance recordkeeping process form, adapted to be operable responsive to control by the operator, and control by a reading control program, to generate data assocated with each such person relating to the school-attendance recordkeeping process, for processing thereof for use in the school-attendance recordkeeping process.

2. An apparatus as in claim 1, in which the code comprises a bar code.

3. An apparatus as in claim 1, in which the reading means include a wand portion, which includes therein means for sensing the personal identifier code on the sheet of paper.

4. An apparatus as in claim 1, in which the personal identifier code generating and printing means are further adapted to provide a space, associated with the personal identifier code, on the sheet of paper for acknowledgement by the person identified by the code.

5. An apparatus as in claim 2, in which the bar code represents an identifier assigned to the person so identified.

6. An apparatus as in claim 2, in which the bar code is convertible into a plurality of bytes, and each byte includes means for self-checking the accuracy of the reading of the byte by the reading means.

7. An apparatus as in claim 4, in which the form comprises a list of students, each student being identified by a printed code.

8. An apparatus as in claim 5, in which each byte includes a plurality of bits, and the self-checking means comprises a further parity bit in each byte.

9. An apparatus as in claim 6, in which each byte represents a numerical character, and the bar code identifier is random relative to an alphabetical sequential listing of persons so identified.

10. A method for generating data associated with a person identified by a unique identifier code assigned to each person on a school attendance roster, for processing thereof for use in the school-attendance recordkeeping process, comprising the steps of:

(a) directing a laser beam, in means, microprocessor-based, for printing the unique personal identifier code on a sheet of paper comprising a form adapted for use in the school-attendance recordkeeping process, which code is adapted to enable the person's file to be addressible directly without correlation to a control file, responsive to control by a laser control program, with a data-base including at least the name of each person in the data base, and the repetitively generated code for each person in the data base, adapted such that no two people have the same code, and each person's name and corresponding code are in a form readable by the printing means; and (b) repetitively using portable compact microprocessor-based means, operable responsive to control by an operator and by a reading control program, to scan the unique directly-addressible personal identifier code for reading thereof from the school-attendance recordkeeping process form, so as to generate data associated with the person identified by the code relating to the school-attendance recordkeeping process, for processing thereof for use in the school-attendance recordkeeping process.

* * * * *